(12) United States Patent
Yang et al.

(10) Patent No.: US 12,511,885 B2
(45) Date of Patent: Dec. 30, 2025

(54) SYSTEMS AND METHODS FOR OBJECT RECOGNITION

(71) Applicant: ZHEJIANG DAHUA TECHNOLOGY CO., LTD., Zhejiang (CN)

(72) Inventors: Yongtao Yang, Hangzhou (CN); Xingming Zhang, Hangzhou (CN); Huadong Pan, Hangzhou (CN); Bangjie Tang, Hangzhou (CN); Hui Su, Hangzhou (CN); Jun Yin, Hangzhou (CN)

(73) Assignee: ZHEJIANG DAHUA TECHNOLOGY CO., LTD., Hangzhou (CN)

( * ) Notice: Subject to any disclaimer, the term of this patent is extended or adjusted under 35 U.S.C. 154(b) by 430 days.

(21) Appl. No.: 18/305,349

(22) Filed: Apr. 23, 2023

(65) Prior Publication Data

US 2023/0260263 A1 Aug. 17, 2023

Related U.S. Application Data

(63) Continuation of application No. PCT/CN2021/126354, filed on Oct. 26, 2021.

(30) Foreign Application Priority Data

Dec. 3, 2020 (CN) .......................... 202011415886.8

(51) Int. Cl.
*G06V 10/776* (2022.01)
*G06V 10/74* (2022.01)
*G06V 20/52* (2022.01)

(52) U.S. Cl.
CPC .......... *G06V 10/776* (2022.01); *G06V 10/761* (2022.01); *G06V 20/52* (2022.01)

(58) Field of Classification Search
CPC .... G06V 10/776; G06V 10/761; G06V 20/52; G06V 40/103; G06F 18/24
See application file for complete search history.

(56) References Cited

U.S. PATENT DOCUMENTS 10,289,910 B1   5/2019  Chen et al.
2013/0034295 A1 2/2013  Tsuchinaga et al.
(Continued)

FOREIGN PATENT DOCUMENTS

CN   108764371    * 11/2018   ........... G06F 18/241
CN   108764371 A    11/2018
(Continued)

OTHER PUBLICATIONS

Rish et al, ("An empirical study of the naive Bayes classifier", T.J. Watson Research Center, Jan. 2001, pp. 41-46) (Year: 2001).*
(Continued)

*Primary Examiner* — Amara Abdi
(74) *Attorney, Agent, or Firm* — METIS IP LLC

(57) ABSTRACT

The present disclosure relates to systems and methods for object recognition. The systems may obtain an image associated with an object. The systems may determine, using a recognition model, an initial recognition result of the object based on the image. The initial recognition result may include a plurality of initial recognition values corresponding to a plurality of predetermined categories respectively. Each of the plurality of initial recognition values may indicate an initial probability that the object corresponds to a corresponding predetermined category. In response to determining that the initial recognition result satisfies a preset condition, for each of the plurality of predetermined categories, the systems may obtain a reference probability corresponding to the predetermined category. The systems may determine a target recognition result of the object by adjusting the plurality of initial recognition values based on (Continued)

a plurality of reference probabilities corresponding to the plurality of predetermined categories respectively. The target recognition result may include a plurality of target recognition values corresponding to the plurality of predetermined categories respectively. Each of the plurality of target recognition values may indicate a target probability that the object corresponds to a corresponding predetermined category.

20 Claims, 9 Drawing Sheets

(56) References Cited

U.S. PATENT DOCUMENTS

| | | | |
|---|---|---|---|
| 2019/0213448 A1* | 7/2019 | Peng | G06F 18/214 |
| 2021/0034843 A1* | 2/2021 | Sivan | G06V 20/17 |
| 2021/0314524 A1* | 10/2021 | Hao | H04N 7/15 |
| 2022/0237907 A1* | 7/2022 | Tang | G06V 10/761 |
| 2023/0222821 A1* | 7/2023 | Delp, III | G06V 10/44 |
| | | | 382/110 |

FOREIGN PATENT DOCUMENTS

| | | |
|---|---|---|
| CN | 108805198 A | 11/2018 |
| CN | 110569779 A | 12/2019 |
| CN | 110688888 A | 1/2020 |
| CN | 111814655 A | 10/2020 |
| CN | 111814810 A | 10/2020 |
| CN | 111814846 A | 10/2020 |
| WO | 2022116744 A1 | 6/2022 |

OTHER PUBLICATIONS

International Search Report in PCT/CN2021/126354 mailed on Jan. 26, 2022, 4 pages.
Written Opinion in PCT/CN2021/126354 mailed on Jan. 26, 2022, 5 pages.
First Office Action in Chinese Application No. 202011415886.8 mailed on Dec. 16, 2021, 26 pages.
The Extended European Search Report in European Application No. 21899778.1 mailed on Feb. 13, 2024, 8 pages.
"An empirical study of the naive Bayes classifier", Web page <https://faculty.cc.gatech.edu/~isbell/reading/papers/Rish.pdf>, Jan. 1, 2001.

* cited by examiner

SYSTEMS AND METHODS FOR OBJECT RECOGNITION

CROSS-REFERENCE TO RELATED APPLICATIONS

This application is a Continuation of International Application No. PCT/CN2021/126354 filed on Oct. 26, 2021, which claims priority to Chinese Patent Application No. 202011415886.8 filed on Dec. 3, 2020, the contents of each of which are incorporated herein by reference in their entirety.

TECHNICAL FIELD

The present disclosure generally relates to image processing, and in particular, to systems and methods for object recognition.

BACKGROUND

With the development of video surveillance technology in various fields (e.g., security monitoring), monitoring devices are widely used to monitor objects (e.g., pedestrians) in specific scenes. Commonly, an object recognition system can recognize a category (e.g., gender, age range, clothes color) of an object based on an image associated with the object captured by a monitoring device. However, in some situations, due to the complexity of the monitoring scene or various statuses of the object, the recognition accuracy may be relatively low. Therefore, it is desirable to provide improved systems and methods for object recognition, thereby improving the recognition accuracy.

SUMMARY

An aspect of the present disclosure relates to a system for object recognition. The system may include at least one storage device including a set of instructions and at least one processor in communication with the at least one storage device. When executing the set of instructions, the at least one processor may be directed to cause the system to implement operations. The operations may include obtaining an image associated with an object and determining, using a recognition model, an initial recognition result of the object based on the image. The initial recognition result may include a plurality of initial recognition values corresponding to a plurality of predetermined categories respectively. Each of the plurality of initial recognition values may indicate an initial probability that the object corresponds to a corresponding predetermined category. The operations may include obtaining, in response to determining that the initial recognition result satisfies a preset condition, for each of the plurality of predetermined categories, a reference probability corresponding to the predetermined category. The operations may further include determining a target recognition result of the object by adjusting the plurality of initial recognition values based on a plurality of reference probabilities corresponding to the plurality of predetermined categories respectively. The target recognition result may include a plurality of target recognition values corresponding to the plurality of predetermined categories respectively. Each of the plurality of target recognition values may indicate a target probability that the object corresponds to a corresponding predetermined category.

In some embodiments, the preset condition may include that the plurality of initial recognition values in the initial recognition result are less than a predetermined threshold.

In some embodiments, the obtaining the reference probability corresponding to the predetermined category may include obtaining, from a reference image set, a plurality of reference images, and determining the reference probability corresponding to the predetermined category based on a plurality of reference recognition results corresponding to the plurality of reference images respectively. For each of the plurality of reference images, the reference recognition result may include a plurality of reference recognition values corresponding to the plurality of predetermined categories respectively.

In some embodiments, each reference image in the reference image set may correspond to one of the plurality of predetermined categories. Counts of reference images corresponding to different predetermined categories may be substantially the same.

In some embodiments, for each of the plurality of reference images, a difference or a distance between a corresponding reference recognition result and the initial recognition result may be less than a difference threshold or a distance threshold.

In some embodiments, for each of the plurality of reference images, a similarity between the reference image and the image may be larger than a similarity threshold.

In some embodiments, the determining the reference probability corresponding to the predetermined category based on the reference recognition results corresponding to the plurality of reference images may include for each of the plurality of reference recognition results corresponding to the plurality of reference images respectively, determining a maximum reference recognition value in the reference recognition result; determining a first sum of maximum reference recognition values each of which corresponds to the predetermined category; determining a second sum of maximum reference recognition values corresponding to the plurality of reference recognition results respectively; and determining the reference probability corresponding to the predetermined category based on the first sum and the second sum.

In some embodiments, the determining the target recognition result of the object by adjusting the plurality of initial recognition values based on the plurality of reference probabilities corresponding to the plurality of predetermined categories respectively may include for each of the plurality of predetermined categories, determining a target recognition value corresponding to the predetermined category based on a product of an initial recognition value and a reference probability corresponding to the predetermined category.

In some embodiments, the determining the target recognition result of the object by adjusting the plurality of initial recognition values based on the plurality of reference probabilities corresponding to the plurality of predetermined categories respectively may include for each of the plurality of predetermined categories, determining a product of an initial recognition value and a reference probability corresponding to the predetermined category; determining a sum of products corresponding to the plurality of predetermined categories respectively; and for each of the plurality of predetermined categories, determining a target recognition value corresponding to the predetermined category based on the product corresponding to the predetermined category and the sum of the products corresponding to the plurality of predetermined categories respectively.

In some embodiments, the operations may further include designating a predetermined category corresponding to a largest target recognition value in the target recognition result as a target category of the object.

A further aspect of the present disclosure relates to a method for object recognition. The method may be implemented on a computing device including at least one processor, at least one storage medium, and a communication platform connected to a network. The method may include obtaining an image associated with an object and determining, using a recognition model, an initial recognition result of the object based on the image. The initial recognition result may include a plurality of initial recognition values corresponding to a plurality of predetermined categories respectively. Each of the plurality of initial recognition values may indicate an initial probability that the object corresponds to a corresponding predetermined category. The method may include, obtaining, in response to determining that the initial recognition result satisfies a preset condition, for each of the plurality of predetermined categories, a reference probability corresponding to the predetermined category. The method may further include determining a target recognition result of the object by adjusting the plurality of initial recognition values based on a plurality of reference probabilities corresponding to the plurality of predetermined categories respectively. The target recognition result may include a plurality of target recognition values corresponding to the plurality of predetermined categories respectively. Each of the plurality of target recognition values may indicate a target probability that the object corresponds to a corresponding predetermined category.

A still further aspect of the present disclosure relates to a system for object recognition. The system may include a first obtaining module, a first determination module, a second obtaining module, and a second determination module. The first obtaining module may be configured to obtain an image associated with an object. The first determination module may be configured to determine, using a recognition model, an initial recognition result of the object based on the image. The initial recognition result may include a plurality of initial recognition values corresponding to a plurality of predetermined categories respectively. Each of the plurality of initial recognition values may indicate an initial probability that the object corresponds to a corresponding predetermined category. The second obtaining module may be configured to obtain, in response to determining that the initial recognition result satisfies a preset condition, for each of the plurality of predetermined categories, a reference probability corresponding to the predetermined category. The second determination module may be configured to determine a target recognition result of the object by adjusting the plurality of initial recognition values based on a plurality of reference probabilities corresponding to the plurality of predetermined categories respectively. The target recognition result may include a plurality of target recognition values corresponding to the plurality of predetermined categories respectively. Each of the plurality of target recognition values may indicate a target probability that the object corresponds to a corresponding predetermined category.

A still further aspect of the present disclosure relates to a non-transitory computer readable medium including executable instructions. When the executable instructions are executed by at least one processor, the executable instructions may direct the at least one processor to perform a method. The method may include obtaining an image associated with an object and determining, using a recognition model, an initial recognition result of the object based on the image. The initial recognition result may include a plurality of initial recognition values corresponding to a plurality of predetermined categories respectively. Each of the plurality of initial recognition values may indicate an initial probability that the object corresponds to a corresponding predetermined category. The method may include, obtaining, in response to determining that the initial recognition result satisfies a preset condition, for each of the plurality of predetermined categories, a reference probability corresponding to the predetermined category. The method may further include determining a target recognition result of the object by adjusting the plurality of initial recognition values based on a plurality of reference probabilities corresponding to the plurality of predetermined categories respectively. The target recognition result may include a plurality of target recognition values corresponding to the plurality of predetermined categories respectively. Each of the plurality of target recognition values may indicate a target probability that the object corresponds to a corresponding predetermined category.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities, and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
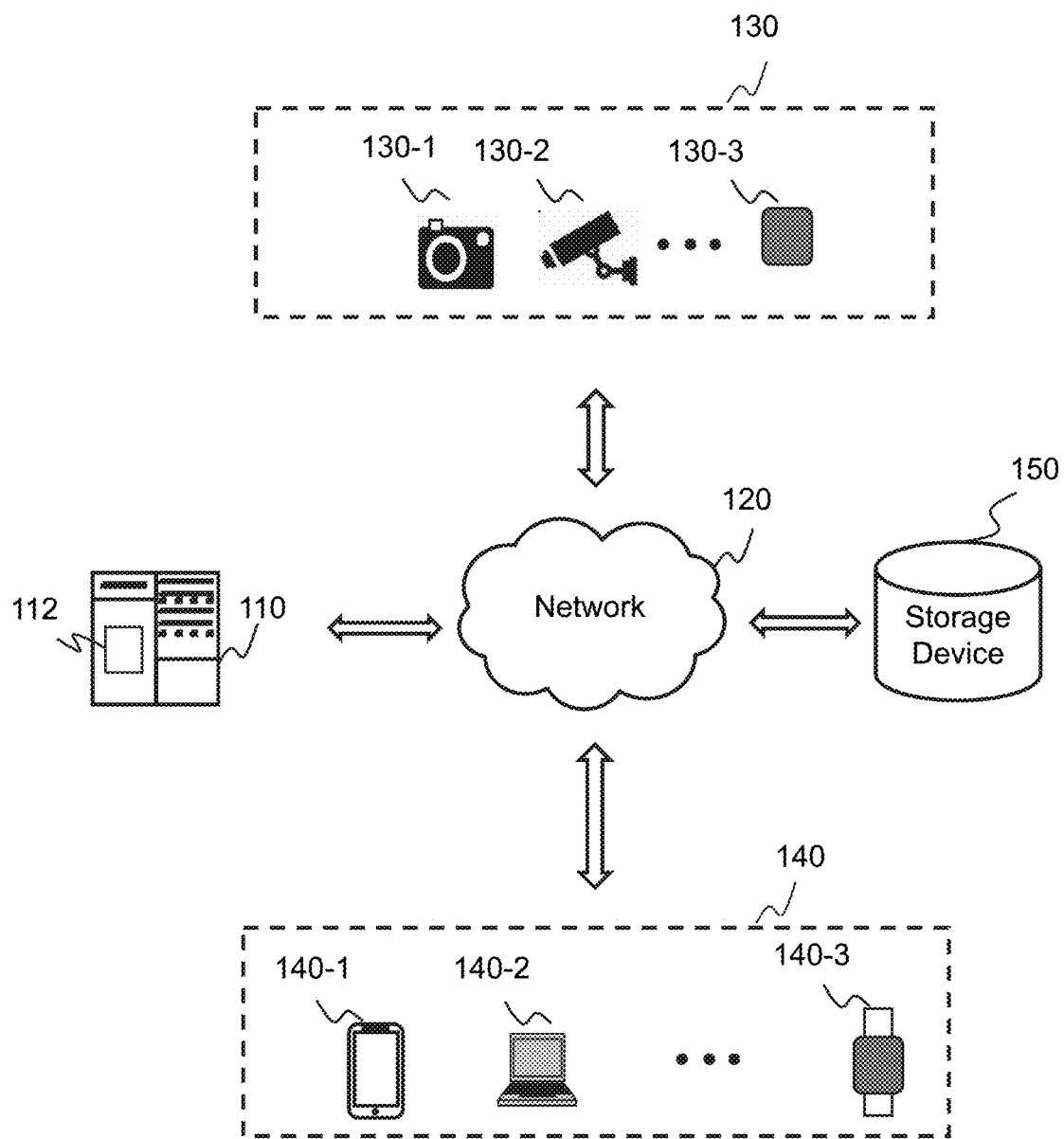
FIG. 1 is a schematic diagram illustrating an exemplary object recognition system according to some embodiments of the present disclosure.

In the following detailed description, numerous specific details are set forth by way of examples in order to provide a thorough understanding of the relevant disclosure. However, it should be apparent to those skilled in the art that the present disclosure may be practiced without such details. In other instances, well-known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

It will be understood that the terms "system," "engine," "unit," "module," and/or "block" used herein are one method to distinguish different components, elements, parts, sections, or assemblies of different levels in ascending order. However, the terms may be displaced by other expressions if they may achieve the same purpose.

Generally, the words "module," "unit," or "block" used herein, refer to logic embodied in hardware or firmware, or to a collection of software instructions. A module, a unit, or a block described herein may be implemented as software and/or hardware and may be stored in any type of non-transitory computer-readable medium or other storage devices. In some embodiments, a software module/unit/block may be compiled and linked into an executable program. It will be appreciated that software modules can be callable from other modules/units/blocks or from themselves, and/or may be invoked in response to detected events or interrupts. Software modules/units/blocks configured for execution on computing devices (e.g., processor 220 illustrated in FIG. 2) may be provided on a computer-readable medium, such as a compact disc, a digital video disc, a flash drive, a magnetic disc, or any other tangible medium, or as a digital download (and can be originally stored in a compressed or installable format that needs installation, decompression, or decryption prior to execution). Such software code may be stored, partially or fully, on a storage device of the executing computing device, for execution by the computing device. Software instructions may be embedded in firmware, such as an EPROM. It will be further appreciated that hardware modules (or units or blocks) may be included in connected logic components, such as gates and flip-flops, and/or can be included in programmable units, such as programmable gate arrays or processors. The modules (or units or blocks) or computing device functionality described herein may be implemented as software modules (or units or blocks), but may be represented in hardware or firmware. In general, the modules (or units or blocks) described herein refer to logical modules (or units or blocks) that may be combined with other modules (or units or blocks) or divided into sub-modules (or sub-units or sub-blocks) despite their physical organization or storage.

It will be understood that when a unit, an engine, a module, or a block is referred to as being "on," "connected to," or "coupled to" another unit, engine, module, or block, it may be directly on, connected or coupled to, or communicate with the other unit, engine, module, or block, or an intervening unit, engine, module, or block may be present, unless the context clearly indicates otherwise. As used herein, the term "and/or" includes any and all combinations of one or more of the associated listed items.

The terminology used herein is for the purposes of describing particular examples and embodiments only and is not intended to be limiting. As used herein, the singular forms "a," "an," and "the" may be intended to include the plural forms as well, unless the context clearly indicates otherwise. It will be further understood that the terms "include" and/or "comprise," when used in this disclosure, specify the presence of integers, devices, behaviors, stated features, steps, elements, operations, and/or components, but do not exclude the presence or addition of one or more other integers, devices, behaviors, features, steps, elements, operations, components, and/or groups thereof.

In addition, it should be understood that in the description of the present disclosure, the terms "first", "second", or the like, are only used for the purpose of differentiation, and cannot be interpreted as indicating or implying relative importance, nor can be understood as indicating or implying the order.

The flowcharts used in the present disclosure illustrate operations that systems implement according to some embodiments of the present disclosure. It is to be expressly understood, the operations of the flowcharts may be implemented not in order. Conversely, the operations may be implemented in an inverted order, or simultaneously. Moreover, one or more other operations may be added to the flowcharts. One or more operations may be removed from the flowcharts.

An aspect of the present disclosure relates to systems and methods for object recognition. The systems may obtain an image associated with an object (e.g., a pedestrian) and determine, using a recognition model, an initial recognition result of the object based on the image. The initial recognition result may include a plurality of initial recognition values corresponding to a plurality of predetermined categories (e.g., take "gender" for example, the predetermined categories include "male" and "female") respectively. Each of the plurality of initial recognition values may indicate an initial probability that the object corresponds to a corresponding predetermined category. In response to determining that the initial recognition result satisfies a preset condition (e.g., the plurality of initial recognition values in the initial recognition result are less than a predetermined threshold), for each of the plurality of predetermined categories, the systems may obtain a reference probability corresponding to the predetermined category. According to a plurality of reference probabilities corresponding to the plurality of predetermined categories respectively, the systems may determine a target recognition result of the object by adjusting the plurality of initial recognition values. The target recognition result may include a plurality of target recognition values corresponding to the plurality of predetermined categories respectively. Each of the plurality of target recognition values may indicate a target probability that the object corresponds to a corresponding predetermined category. Further, the systems may designate a predetermined category corresponding to a largest target recognition value in the target recognition result as a target category of the object.

According to the systems and methods of the present disclosure, when the initial recognition result of an object satisfies a preset condition (which indicates that the recognition ability of the recognition model with respect to the object may be relatively low and/or a category of the object is unobvious in the image), the initial recognition values in the initial recognition result of the object may be adjusted based on a reference probability, which can correct the initial recognition result corresponding to the image with unobvious object category, thereby improving the recognition accuracy.

FIG. 1 is a schematic diagram illustrating an exemplary object recognition system according to some embodiments of the present disclosure. As shown, the object recognition system 100 may include a server 110, a network 120, an acquisition device 130, a user device 140, and a storage device 150. In some embodiments, the object recognition system 100 may be applied in various application scenarios, for example, object monitoring, security monitoring, traffic monitoring, etc.

The server 110 may be a single server or a server group. The server group may be centralized or distributed (e.g., the server 110 may be a distributed system). In some embodiments, the server 110 may be local or remote. For example, the server 110 may access information and/or data stored in the acquisition device 130, the user device 140, and/or the storage device 150 via the network 120. As another example, the server 110 may be directly connected to the acquisition device 130, the user device 140, and/or the storage device 150 to access stored information and/or data. In some embodiments, the server 110 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof. In some embodiments, the server 110 may be implemented on a computing device 200 including one or more components illustrated in FIG. 2 of the present disclosure.

In some embodiments, the server 110 may include a processing device 112. The processing device 112 may process information and/or data relating to object recognition to perform one or more functions described in the present disclosure. For example, the processing device 112 may obtain an image associated with an object and determine, using a recognition model, an initial recognition result of the object based on the image. In response to determining that the initial recognition result satisfies a preset condition, for each of the plurality of predetermined categories, the processing device 112 may obtain a reference probability corresponding to the predetermined category. According to a plurality of reference probabilities corresponding to the plurality of predetermined categories respectively, the processing device 112 may determine a target recognition result of the object by adjusting the plurality of initial recognition values. In some embodiments, the processing device 112 may include one or more processing devices (e.g., single-core processing device(s) or multi-core processor(s)).

In some embodiment, the server 110 may be unnecessary and all or part of the functions of the server 110 may be implemented by other components (e.g., the acquisition device 130, the user device 140) of the object recognition system 100. For example, the processing device 112 may be integrated into the acquisition device 130 or the user device 140 and the functions (e.g., determining the target recognition result of the object) of the processing device 112 may be implemented by the acquisition device 130 or the user device 140.

The network 120 may facilitate exchange of information and/or data for the object recognition system 100. In some embodiments, one or more components (e.g., the server 110, the acquisition device 130, the user device 140, the storage device 150) of the object recognition system 100 may transmit information and/or data to other component(s) of the object recognition system 100 via the network 120. For example, the server 110 may obtain the image associated with the object from the acquisition device 130 via the network 120. As another example, the server 110 may transmit the image associated with the object and/or the target recognition result of the object to the user device 140 via the network 120. In some embodiments, one or more components (e.g., the server 110, the acquisition device 130, the user device 140, the storage device 150) of the object recognition system 100 may communicate information and/or data with one or more external resources such as an external database of a third party, etc. For example, the server 110 may obtain a model (e.g., a recognition model) associated with the object recognition from a database of a vendor or manufacture that provides and/or updates the model. In some embodiments, the network 120 may be any type of wired or wireless network, or a combination thereof.

The acquisition device 130 may be configured to acquire an image (the "image" herein refers to a single image or a frame of a video). In some embodiments, the acquisition device 130 may include a camera 130-1, a video recorder 130-2, an image sensor 130-3, etc. The camera 130-1 may include a gun camera, a dome camera, an integrated camera, a monocular camera, a binocular camera, a multi-view camera, or the like, or any combination thereof. The video recorder 130-2 may include a PC Digital Video Recorder (DVR), an embedded DVR, or the like, or any combination thereof. The image sensor 130-3 may include a Charge Coupled Device (CCD) image sensor, a Complementary Metal Oxide Semiconductor (CMOS) image sensor, or the like, or any combination thereof. In some embodiments, the acquisition device 130 may include a plurality of components each of which can acquire an image. For example, the acquisition device 130 may include a plurality of sub-cameras that can capture images or videos simultaneously. In some embodiments, the acquisition device 130 may transmit the acquired image to one or more components (e.g., the server 110, the user device 140, the storage device 150) of the object recognition system 100 via the network 120.

The user device 140 may be configured to receive information and/or data from the server 110, the acquisition device 130, and/or the storage device 150, via the network 120. For example, the user device 140 may receive the image associated with the object from the acquisition device 130. As another example, the user device 140 may receive the initial recognition result and the target recognition result of the object from the server 110. In some embodiments, the user device 140 may process information and/or data received from the server 110, the acquisition device 130, and/or the storage device 150, via the network 120. In some embodiments, the user device 140 may provide a user interface via which a user may view information and/or input data and/or instructions to the object recognition system 100. For example, the user may view the image associated with the object and/or the target recognition result of the object via the user interface. As another example, the user may input an instruction associated with the object recognition via the user interface. In some embodiments, the user device 140 may include a mobile phone 140-1, a computer 140-2, a wearable device 140-3, or the like, or any combination thereof. In some embodiments, the user device 140 may include a display that can display information in a human-readable form, such as text, image, audio, video, graph, animation, or the like, or any combination thereof.

The storage device 150 may be configured to store data and/or instructions. The data and/or instructions may be obtained from, for example, the server 110, the acquisition device 130, and/or any other component of the object recognition system 100. In some embodiments, the storage device 150 may store data and/or instructions that the server 110 may execute or use to perform exemplary methods described in the present disclosure. In some embodiments, the storage device 150 may include a mass storage, a removable storage, a volatile read-and-write memory, a read-only memory (ROM), or the like, or any combination thereof. In some embodiments, the storage device 150 may be implemented on the cloud platform disclosed elsewhere in the present disclosure. In some embodiments, the storage device 150 may be connected to the network 120 to communicate with one or more components (e.g., the server 110, the acquisition device 130, the user device 140) of the object recognition system 100. In some embodiments, the storage device 150 may be part of other components of the object recognition system 100, such as the server 110, the acquisition device 130, or the user device 140.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

Figure 2:
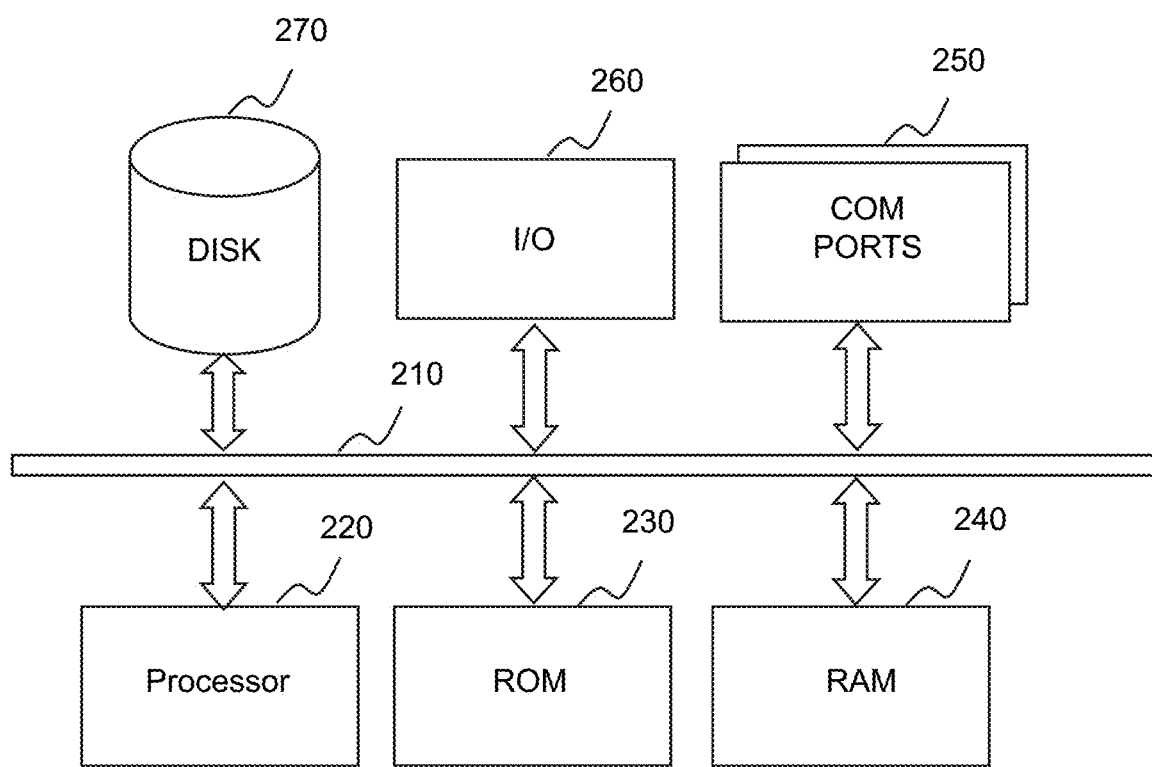
FIG. 2 is a schematic diagram illustrating exemplary hardware and/or software components of an exemplary computing device according to some embodiments of the present disclosure.

FIG. 2 is a schematic diagram illustrating exemplary hardware and/or software components of an exemplary computing device according to some embodiments of the present disclosure. In some embodiments, the server 110 may be implemented on the computing device 200. For example, the processing device 112 may be implemented on the computing device 200 and configured to perform functions of the processing device 112 disclosed in this disclosure.

The computing device 200 may be used to implement any component of the object recognition system 100 as described herein. For example, the processing device 112 may be implemented on the computing device 200, via its hardware, software program, firmware, or a combination thereof. Although only one such computer is shown, for convenience, the computer functions relating to object measurement as described herein may be implemented in a distributed fashion on a number of similar platforms to distribute the processing load.

The computing device 200, for example, may include COM ports 250 connected to and from a network connected thereto to facilitate data communications. The computing device 200 may also include a processor (e.g., a processor 220), in the form of one or more processors (e.g., logic circuits), for executing program instructions. For example, the processor 220 may include interface circuits and processing circuits therein. The interface circuits may be configured to receive electronic signals from a bus 210, wherein the electronic signals encode structured data and/or instructions for the processing circuits to process. The processing circuits may conduct logic calculations, and then determine a conclusion, a result, and/or an instruction encoded as electronic signals. Then the interface circuits may send out the electronic signals from the processing circuits via the bus 210.

The computing device 200 may further include program storage and data storage of different forms including, for example, a disk 270, a read-only memory (ROM) 230, or a random-access memory (RAM) 240, for storing various data files to be processed and/or transmitted by the computing device 200. The computing device 200 may also include program instructions stored in the ROM 230, RAM 240, and/or another type of non-transitory storage medium to be executed by the processor 220. The methods and/or processes of the present disclosure may be implemented as the program instructions. The computing device 200 may also include an I/O component 260, supporting input/output between the computing device 200 and other components. The computing device 200 may also receive programming and data via network communications. Merely for illustration, only one processor is illustrated in FIG. 2. Multiple processors 220 are also contemplated; thus, operations and/or method steps performed by one processor 220 as described in the present disclosure may also be jointly or separately performed by the multiple processors.

Figure 3:
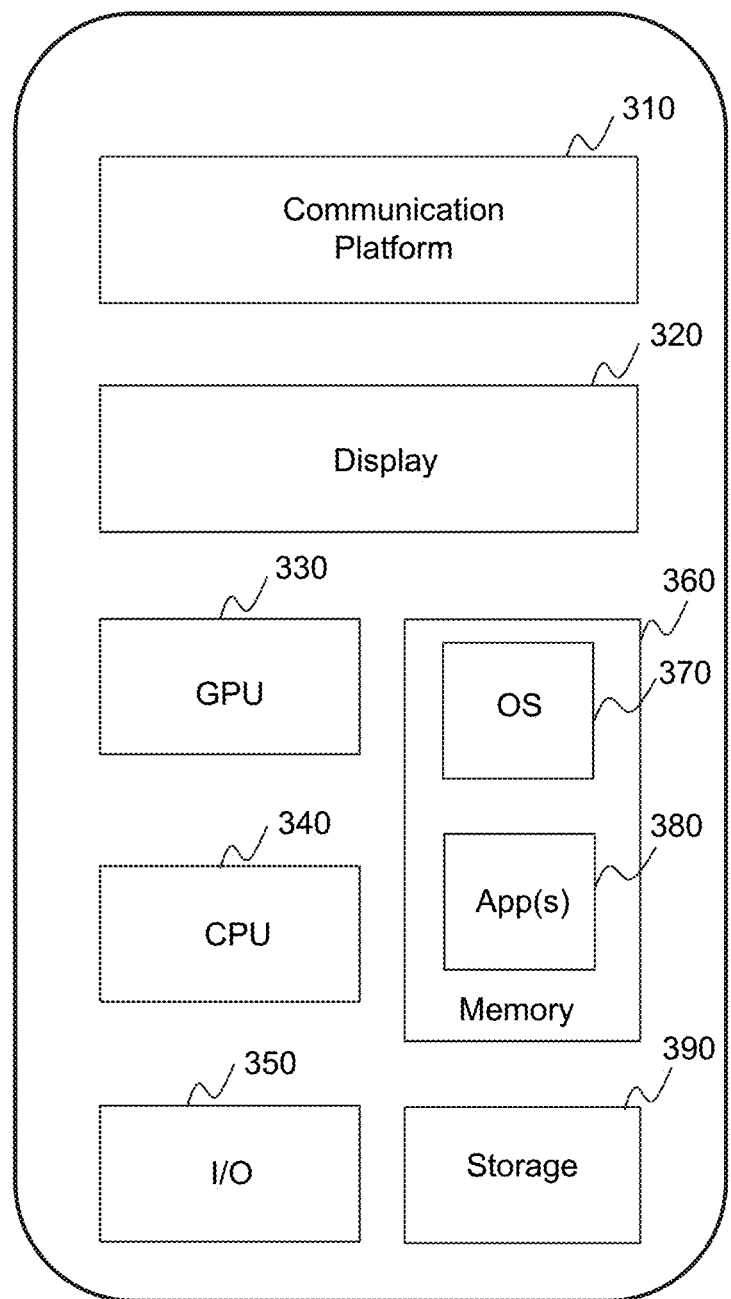
FIG. 3 is a schematic diagram illustrating exemplary hardware and/or software components of an exemplary mobile device according to some embodiments of the present disclosure.

FIG. 3 is a schematic diagram illustrating exemplary hardware and/or software components of an exemplary mobile device according to some embodiments of the present disclosure. In some embodiments, the processing device 112 and/or the user device 140 may be implemented on the mobile device 300 shown in FIG. 3.

As illustrated in FIG. 3, the mobile device 300 may include a communication platform 310, a display 320, a graphic processing unit (GPU) 330, a central processing unit (CPU) 340, an I/O 350, a memory 360, and a storage 390. In some embodiments, any other suitable component, including but not limited to a system bus or a controller (not shown), may also be included in the mobile device 300.

In some embodiments, an operating system 370 (e.g., iOS™, Android™, Windows Phone™) and one or more applications (Apps) 380 may be loaded into the memory 360 from the storage 390 in order to be executed by the CPU 340. The applications 380 may include a browser or any other suitable mobile apps for receiving and rendering information relating to object recognition or other information from the processing device 112. User interactions may be achieved via the I/O 350 and provided to the processing device 112 and/or other components of the object recognition system 100 via the network 120.

Figure 4:
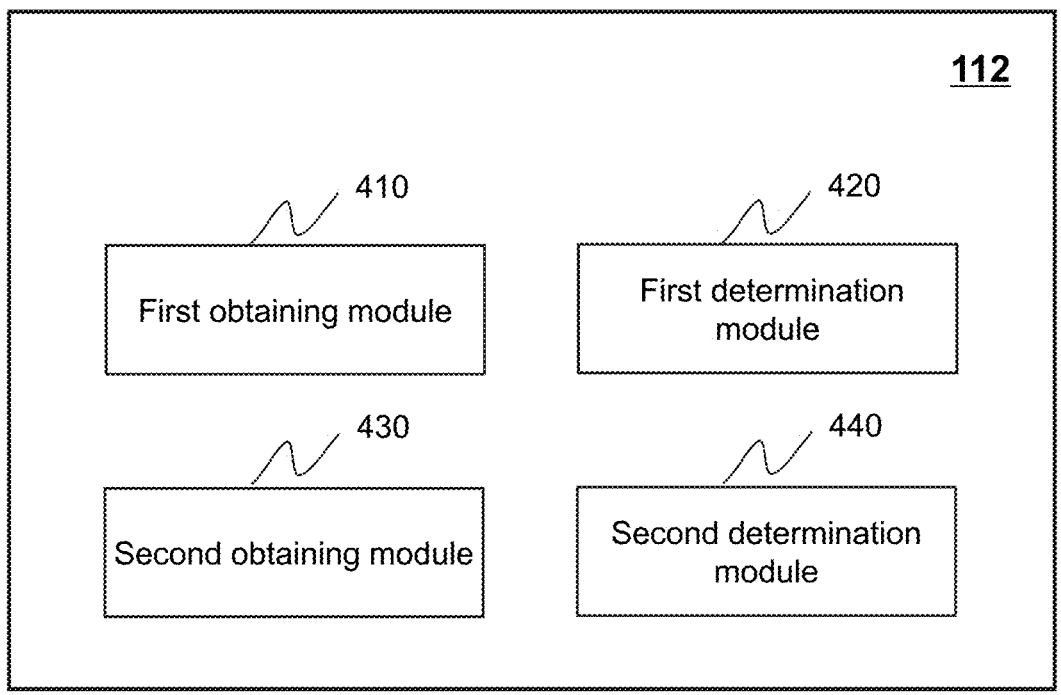
FIG. 4 is a block diagram illustrating an exemplary processing device according to some embodiments of the present disclosure.

FIG. 4 is a block diagram illustrating an exemplary processing device according to some embodiments of the present disclosure. The processing device 112 may include a first obtaining module 410, a first determination module 420, a second obtaining module 430, and a second determination module 440.

The first obtaining module 410 may be configured to obtain an image associated with an object. More descriptions regarding the obtaining of the image associated with the object may be found elsewhere in the present disclosure, for example, operation 510 in FIG. 5 and relevant descriptions thereof.

The first determination module 420 may be configured to determine an initial recognition result of the object based on the image using a recognition model. In some embodiments, the initial recognition result may include a plurality of initial recognition values corresponding to a plurality of predetermined categories respectively, wherein each of the plurality of initial recognition values indicates an initial probability that the object corresponds to a corresponding predetermined category. More descriptions regarding the determining of the initial recognition result may be found elsewhere in the present disclosure, for example, operation 520 in FIG. 5 and relevant descriptions thereof.

In response to determining that the initial recognition result satisfies a preset condition, for each of the plurality of predetermined categories, the second obtaining module 430 may be configured to obtain a reference probability corresponding to the predetermined category. In some embodiments, the preset condition may include that the plurality of initial recognition values in the initial recognition result are less than a predetermined threshold. More descriptions regarding the obtaining of the reference probability may be found elsewhere in the present disclosure, for example, operation 530 in FIG. 5 and relevant descriptions thereof.

The second determination module 440 may be configured to determine a target recognition result of the object by adjusting the plurality of initial recognition values based on a plurality of reference probabilities corresponding to the plurality of predetermined categories respectively. Similar to the initial recognition result, the target recognition result may include a plurality of target recognition values corresponding to the plurality of predetermined categories respectively, wherein each of the plurality of target recognition values indicates a target probability that the object corresponds to a corresponding predetermined category. More descriptions regarding the determining of the target recognition result may be found elsewhere in the present disclosure, for example, operation 540 in FIG. 5 and relevant descriptions thereof.

The modules in the processing device 112 may be connected to or communicate with each other via a wired connection or a wireless connection. The wired connection may include a metal cable, an optical cable, a hybrid cable, or the like, or any combination thereof. The wireless connection may include a Local Area Network (LAN), a Wide Area Network (WAN), a Bluetooth, a ZigBee, a Near Field Communication (NFC), or the like, or any combination thereof. In some embodiments, two or more of the modules may be combined as a single module, and any one of the modules may be divided into two or more units. For example, the first determination module 420 and the second determination module 440 may be combined as a single module which may both determine the initial recognition result and the target recognition result of the object. In some embodiments, the processing device 112 may include one or more additional modules. For example, the processing device 112 may also include a transmission module (not shown) configured to transmit signals (e.g., electrical signals, electromagnetic signals) to one or more components (e.g., the acquisition device 130, the user device 140) of the object recognition system 100. As another example, the processing device 112 may include a storage module (not shown) used to store information and/or data (e.g., the image associated with the object, the recognition model, the initial recognition result, the target recognition result) associated with the object recognition.

Figure 5:
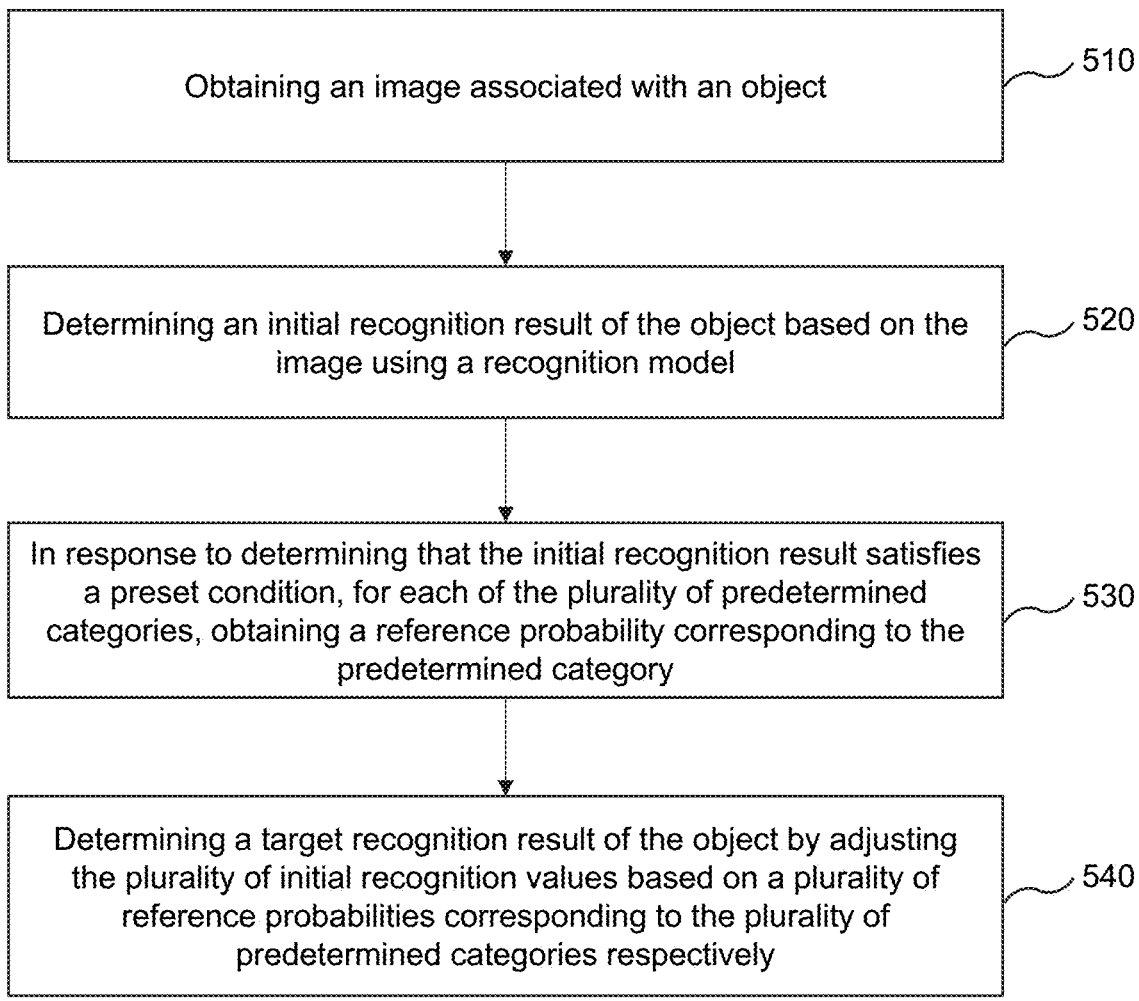
FIG. 5 is a flowchart illustrating an exemplary process for object recognition according to some embodiments of the present disclosure.

FIG. 5 is a flowchart illustrating an exemplary process for object recognition according to some embodiments of the present disclosure. In some embodiments, process 500 may be executed by the object recognition system 100. For example, the process 500 may be implemented as a set of instructions (e.g., an application) stored in a storage device (e.g., the storage device 150, the ROM 230, the RAM 240, and/or the storage 390). In some embodiments, the processing device 112 (e.g., the processor 220 of the computing device 200, the CPU 340 of the mobile device 300, and/or one or more modules illustrated in FIG. 4) may execute the set of instructions and may accordingly be directed to perform the process 500. The operations of the illustrated process presented below are intended to be illustrative. In some embodiments, the process 500 may be accomplished with one or more additional operations not described and/or without one or more of the operations discussed. Additionally, the order of the operations of process 500 illustrated in FIG. 5 and described below is not intended to be limiting.

In 510, the processing device 112 (e.g., the first obtaining module 410 illustrated in FIG. 4) (e.g., the interface circuits of the processor 220) may obtain an image associated with an object.

In some embodiments, the object may include a biological object and/or a non-biological object. An exemplary biological object may include a person (e.g., a pedestrian), an animal, a plant, or the like, or any combination thereof. An exemplary non-biological object may include a vehicle, a traffic sign, an aircraft, a detector, a robot, or the like, or any combination thereof. For illustration purposes, the following descriptions regarding the object take "person" as an example.

In some embodiments, the processing device 112 may direct the acquisition device 130 (e.g., the camera 130-1, the video recorder 130-2, the image sensor 130-3 illustrated in FIG. 1) to capture the image associated with the object and obtain the image accordingly. In some embodiments, the processing device 112 may obtain or determine the image from a video captured by the acquisition device 130. For example, the processing device 112 may perform a framing operation on the video to obtain the image from the video.

In some embodiments, the image associated with the object may be previously acquired by the acquisition device 130 and stored in a storage device (e.g., the storage device 150, the ROM 230, the RAM 240, and/or the storage 390). The processing device 112 may obtain the image from the storage device via a network (e.g., the network 120).

In 520, the processing device 112 (e.g., the first determination module 420 illustrated in FIG. 4) (e.g., the processing circuits of the processor 220) may determine an initial recognition result of the object based on the image using a recognition model.

In some embodiments, the recognition model may be pre-trained and stored in the storage device (e.g., the storage device 150, the ROM 230, the RAM 240, and/or the storage 390) disclosed elsewhere in the present disclosure. The processing device 112 may retrieve the recognition model from the storage device. In some embodiments, the recognition model may include a machine learning model, for example, a neural network model. An exemplary neural network model may include a multi-layer perceptron (MLP) model, a deep neural network (DNN) model, a convolutional neural network (CNN) model, a deep convolutional encoder-decoder (DCED) network model, a generative adversarial network (GAN) model, or the like, or any combination thereof.

In some embodiments, the processing device 112 may input the image associated with the object into the recognition model and determine the initial recognition result of the object based on an output of the recognition model.

In some embodiments, the initial recognition result may include a plurality of initial recognition values corresponding to a plurality of predetermined categories respectively, wherein each of the plurality of initial recognition values indicates an initial probability (also referred to as a confidence or a confidence level) that the object corresponds to a corresponding predetermined category.

In some embodiments, the plurality of predetermined categories may be associated with a same attribute of the object. An exemplary attribute of the object may include gender, age, clothes color, etc. For example, the plurality of predetermined categories associated with the gender may include "male" and "female." As another example, the plurality of predetermined categories associated with the age may include a plurality of age ranges such as 1-18 years old, 19-30 years old, 31-50 years old, 51-70 years old, 71-90 years old, and more than 90 years old. As a further example, the plurality of predetermined categories associated with the clothes color may include "red," "orange," "yellow," "green," "cyan, blue," "purple," or the like, or any combination thereof.

In some embodiments, initial recognition results corresponding to different attributes of the object may be determined using the same or different recognition models. For example, initial recognition results corresponding to gender, age, and clothes color attributes may be determined using the same recognition model. As another example, the recognition model may include a gender recognition model configured to determine an initial recognition result corresponding to gender, an age recognition model configured to determine an initial recognition result corresponding to age, a clothes color recognition model configured to determine an initial recognition result corresponding to clothes color, etc.

In some embodiments, the initial recognition result may be expressed as a vector. Accordingly, the plurality of initial recognition values may be values in the vector. For example, an initial recognition result corresponding to an image k associated with an object may be expressed as a vector $P^k=[p_1^k, p_2^k, \ldots, p_C^k]$, wherein $p_1^k, p_2^k, \ldots,$ and $p_C^k$ represent initial recognition values corresponding to a plurality of predetermined categories 1, 2, ..., c respectively, $p_1^k, p_2^k$ and $p_C^k$ may indicate initial probabilities that the object corresponds to predetermined categories 1, 2, and c, respectively.

In 530, in response to determining that the initial recognition result satisfies a preset condition, for each of the plurality of predetermined categories, the processing device 112 (e.g., the second obtaining module 430 illustrated in FIG. 4) (e.g., the processing/interface circuits of the processor 220) may obtain a reference probability corresponding to the predetermined category.

In some embodiments, the preset condition may include that the plurality of initial recognition values (e.g., $p_1^k$, $p_2^k \ldots,$ and $p_C^k$) in the initial recognition result (e.g., $P^k$) are less than a predetermined threshold. The predetermined threshold may be a default setting (e.g., 0.5, 0.6, 0.4, 0.3) of the object recognition system 100 or may be adjustable under different situations. When the plurality of initial recognition values in the initial recognition result are less than the predetermined threshold, it may indicate that the recognition ability of the recognition model with respect to the object may be relatively low and/or a category of the object is unobvious in the image. Accordingly, for each of the plurality of predetermined categories, the processing device 112 may obtain a reference probability corresponding to the predetermined category and further determine a target recognition result based on the reference probability in operation 540.

In some embodiments, the processing device 112 may obtain a plurality of reference images from a reference image set and determine the reference probability corresponding to the predetermined category based on a plurality of reference recognition results corresponding to the plurality of reference images respectively. More descriptions of the determining of the reference probability may be found elsewhere in the present disclosure (e.g., FIGS. 6-8 and the descriptions thereof).

In 540, the processing device 112 (e.g., the second determination module 440 illustrated in FIG. 4) (e.g., the processing circuits of the processor 220) may determine a target recognition result of the object by adjusting the plurality of initial recognition values based on a plurality of reference probabilities corresponding to the plurality of predetermined categories respectively.

Similar to the initial recognition result, the target recognition result may include a plurality of target recognition values corresponding to the plurality of predetermined categories respectively, wherein each of the plurality of target recognition values indicates a target probability that the object corresponds to a corresponding predetermined category. For example, the target recognition result may be expressed as a vector $P^{k_1}=[p_1^{k_1}, p_2^{k_1}, \ldots, p_C^{k_1}]$, wherein $p_1^{k_1}$, $p_2^{k_1}, \ldots,$ and $p_C^{k_1}$ represent the plurality of target recognition values in the target recognition result, $p_1^{k_1}, p_2^{k_1},$ and $p_C^{k_1}$ may indicate target probabilities that the object corresponds to predetermined categories 1, 2, and c, respectively.

In some embodiments, for each of the plurality of predetermined categories, the processing device 112 may determine a product of an initial recognition value and a reference probability corresponding to the predetermined category. Further, the processing device 112 may determine a target recognition value corresponding to the predetermined category based on the product. More descriptions of the determining of the target recognition result may be found elsewhere in the present disclosure (e.g., FIG. 9 and the descriptions thereof).

In some embodiments, the processing device 112 may determine the target category of the object based on the target recognition result. For example, the processing device 112 may designate, from the plurality of predetermined categories (e.g., 1, 2, ..., and c), a predetermined category (e.g., c) corresponding to a largest target recognition value (e.g., $p_C^{k_1}$) in the target recognition result (e.g., $[p_1^{k_1}, p_2^{k_1}, \ldots, p_C^{k_1}]$) as the target category of the object.

In the present disclosure, when an initial recognition result of an object satisfies a preset condition (which indicates that the recognition ability of the recognition model with respect to the object may be relatively low and/or a category of the object is unobvious in the image), the initial recognition values in the initial recognition result of the object may be adjusted to obtain a target recognition result and the target category of the object may be determined based on the target recognition result, thereby improving the recognition accuracy of the category of the object in the image.

It should be noted that the above description is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure.

For example, one or more other optional operations (e.g., a storing operation, a transmitting operation) may be added elsewhere in the process 500. In the storing operation, the processing device 112 may store information and/or data (e.g., the image associated with the object, the recognition model, the initial recognition result, the target recognition result) associated with the object recognition in a storage device (e.g., the storage device 150, the ROM 230, the RAM 240, and/or the storage 390) disclosed elsewhere in the present disclosure. In the transmitting operation, the processing device 112 may transmit the image associated with the object, the initial recognition result, and/or the target recognition result to the user device 140. As another example, operation 510 and operation 520 may be combined into a single operation in which the processing device 112 may obtain the image associated with the object and determine the initial recognition result of the object.

In some embodiments, before the recognition model is used, the processing device 112 may evaluate or test a recognition ability of the recognition model based on a plurality of test images. For example, for each of the plurality of test images, the processing device 112 may input the test image into the recognition model and determine a test recognition result of an object in the test image based on an output of the recognition model. A test recognition result may include a plurality of test recognition values. Further, the processing device 112 may determine whether test recognition values in the test recognition result are less than a certain value. For a plurality of test recognition results corresponding to the plurality of test images, if a count of test recognition results with test recognition values less than the certain value is larger than a certain threshold, the processing device 112 may determine that the recognition ability of the recognition model is relatively weak. As another example, each of the plurality of test images may be labeled with a true category of the object in the test image. The processing device 112 may evaluate the recognition ability of the recognition model by comparing the target category of the object determined based on the test recognition result corresponding to the test image with the true category of the object in the test image. For example, if a count of test images with the target category different from the true category is larger than a certain threshold, the processing device 112 may determine that the recognition ability of the recognition model is relatively weak.

Further, the processing device 112 may update the recognition model until the recognition ability of the recognition model becomes strong. Alternatively or additionally, for images similar to the test images, since the recognition ability of the recognition model with respect to the images is relatively weak, the processing device 112 may determine target recognition results of the images based on process 500 described above.

Figure 6:
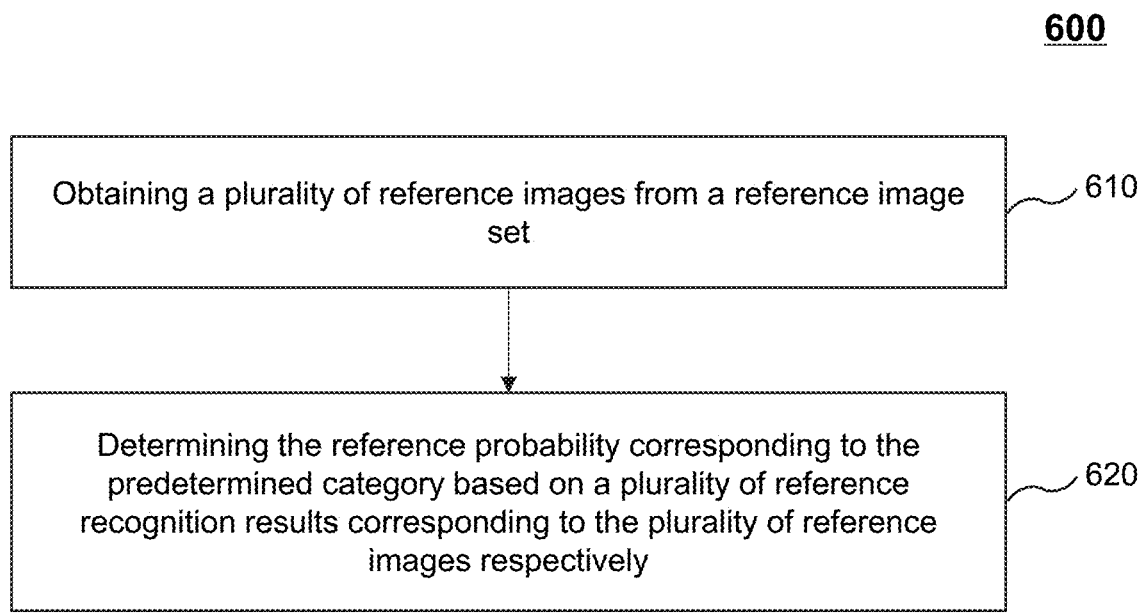
FIG. 6 is a flowchart illustrating an exemplary process for determining a reference probability corresponding to a predetermined category according to some embodiments of the present disclosure.

FIG. 6 is a flowchart illustrating an exemplary process for determining a reference probability corresponding to a predetermined category according to some embodiments of the present disclosure. In some embodiments, process 600 may be executed by the object recognition system 100. For example, the process 600 may be implemented as a set of instructions (e.g., an application) stored in a storage device (e.g., the storage device 150, the ROM 230, the RAM 240, and/or the storage 390). In some embodiments, the processing device 112 (e.g., the processor 220 of the computing device 200, the CPU 340 of the mobile device 300, and/or one or more modules illustrated in FIG. 4) may execute the set of instructions and may accordingly be directed to perform the process 600. The operations of the illustrated process presented below are intended to be illustrative. In some embodiments, the process 600 may be accomplished with one or more additional operations not described and/or without one or more of the operations discussed. Additionally, the order of the operations of process 600 illustrated in FIG. 6 and described below is not intended to be limiting. In some embodiments, one or more operations of the process 600 may be performed to achieve at least part of operation 530 as described in connection with FIG. 5.

In 610, the processing device 112 (e.g., the second obtaining module 430 illustrated in FIG. 4) (e.g., interface circuits of the processor 220) may obtain a plurality of reference images from a reference image set.

In some embodiments, the reference image set may be previously acquired and stored in a storage device (e.g., the storage device 150, the ROM 230, the RAM 240, and/or the storage 390) disclosed elsewhere in the present disclosure or an external storage device. The processing device 112 may obtain the reference image set from the storage device or the external storage device via a network (e.g., the network 120).

In some embodiments, the reference image set may correspond to an attribute (e.g., gender, age, clothes color) of an object. Accordingly, each reference image in the reference image set corresponds to one category under the attribute. In some embodiments, the processing device 112 may obtain the reference image set based on an attribute corresponding to the plurality of predetermined categories. For example, if the attribute of the object associated with the plurality of predetermined categories is "gender," the processing device 112 may obtain the reference image set corresponding to the "gender" attribute. Accordingly, each reference image in the reference image set corresponds to one category (i.e., one of the plurality of predetermined categories) (e.g., male, female) under the "gender" attribute.

In some embodiments, counts of reference images corresponding to different predetermined categories may be substantially the same. For example, when the plurality of predetermined categories include "male" and "female," the reference image set may include at least one reference image corresponding to "male" and at least one reference image corresponding to "female." A count of the at least one reference image corresponding to "male" in the reference image set may be substantially the same as a count of the at least one reference image corresponding to "female" in the reference image set. As another example, when the plurality of predetermined categories include a plurality of age ranges such as 1-18 years old, 19-30 years old, 31-50 years old, 51-70 years old, 71-90 years old, and more than 90 years old, the reference image set may include reference images corresponding to the plurality of age ranges respectively. Counts of reference images corresponding to different age ranges may be substantially the same. In some embodiments, the term "substantially" may indicate a relatively low degree (e.g., 1%) of variation in the value or state it describes.

In some embodiments, for each of the plurality of reference images, a difference or a distance between a corresponding reference recognition result and the initial recognition result is less than a difference threshold or a distance threshold. In some embodiments, the distance may be a Euclidean distance, a Cosine distance, a Manhattan distance, a Mahalanobis distance, a Chebyshev distance, etc. In some embodiments, the difference threshold and/or the distance threshold may be a default setting of the object recognition system 100 or may be adjustable under different situations.

In some embodiments, for each of the plurality of reference images, the processing device 112 may determine a reference recognition result using the recognition model. For example, the processing device 112 may input the reference image into the recognition model and determine the reference recognition result corresponding to the reference image based on an output of the recognition model. Further, the processing device 112 may determine select or screen out reference images with differences or distances between corresponding reference recognition results and the initial recognition result less than a difference threshold or a distance threshold.

Merely by way of example, it is assumed that the initial recognition result is expressed as $P^k=[p_1^k, p_2^k, \ldots, p_C^k]$ and a reference recognition result corresponding to a reference image is expressed as $T=[T_1, T_2, \ldots, T_c]$, the processing device 112 may determine the Euclidean distance between the reference recognition result corresponding to the reference image and the initial recognition result according to formula (1) below:

$$D(T,p^k)=\|T-p^k\|=(\Sigma_{j=1}^{C}(T_j-p_j^k)^2)^{1/2} \quad (1),$$

where $D(T, p^k)$ refers to the Euclidean distance between the reference recognition result $P^k$ and the initial recognition result T.

In some embodiments, for each of the plurality of reference images, a similarity between the reference image and the image associated with the object is larger than a similarity threshold. The similarity threshold may be a default setting of the object recognition system 100 or may be adjustable under different situations. In some embodiments, the processing device 112 may determine the similarity between the reference image and the image associated with the object based on a similarity algorithm. The similarity algorithm may include a histogram matching algorithm, a cosine similarity algorithm, a perceptual hash algorithm, etc.

In 620, the processing device 112 (e.g., the second obtaining module 430 illustrated in FIG. 4) (e.g., processing circuits of the processor 220) may determine the reference probability corresponding to the predetermined category based on a plurality of reference recognition results corresponding to the plurality of reference images respectively.

In some embodiments, for each of the plurality of reference images, the reference recognition result may include a plurality of reference recognition values corresponding to the plurality of predetermined categories respectively. For example, the reference recognition result corresponding to a reference image may be expressed as a vector $T=[T_1, T_2, \ldots, T_c]$, wherein $T_1, T_2, \ldots,$ and $T_c$ represent the plurality of reference recognition values in the reference recognition result corresponding to the plurality of predetermined categories $1, 2, \ldots, c$ respectively.

In some embodiments, for each of the plurality of reference recognition results corresponding to the plurality of reference images respectively, the processing device 112 may determine a maximum reference recognition value in the reference recognition result. Further, the processing device 112 may determine a first sum of maximum reference recognition values each of which corresponds to the predetermined category and a second sum of maximum reference recognition values corresponding to the plurality of reference recognition results respectively. According to the first sum and the second sum, the processing device 112 may determine the reference probability corresponding to the predetermined category. More descriptions of the determining of the reference probability may be found elsewhere in the present disclosure (e.g., FIGS. 7-8 and the descriptions thereof).

It should be noted that the above description is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure.

Figure 7:
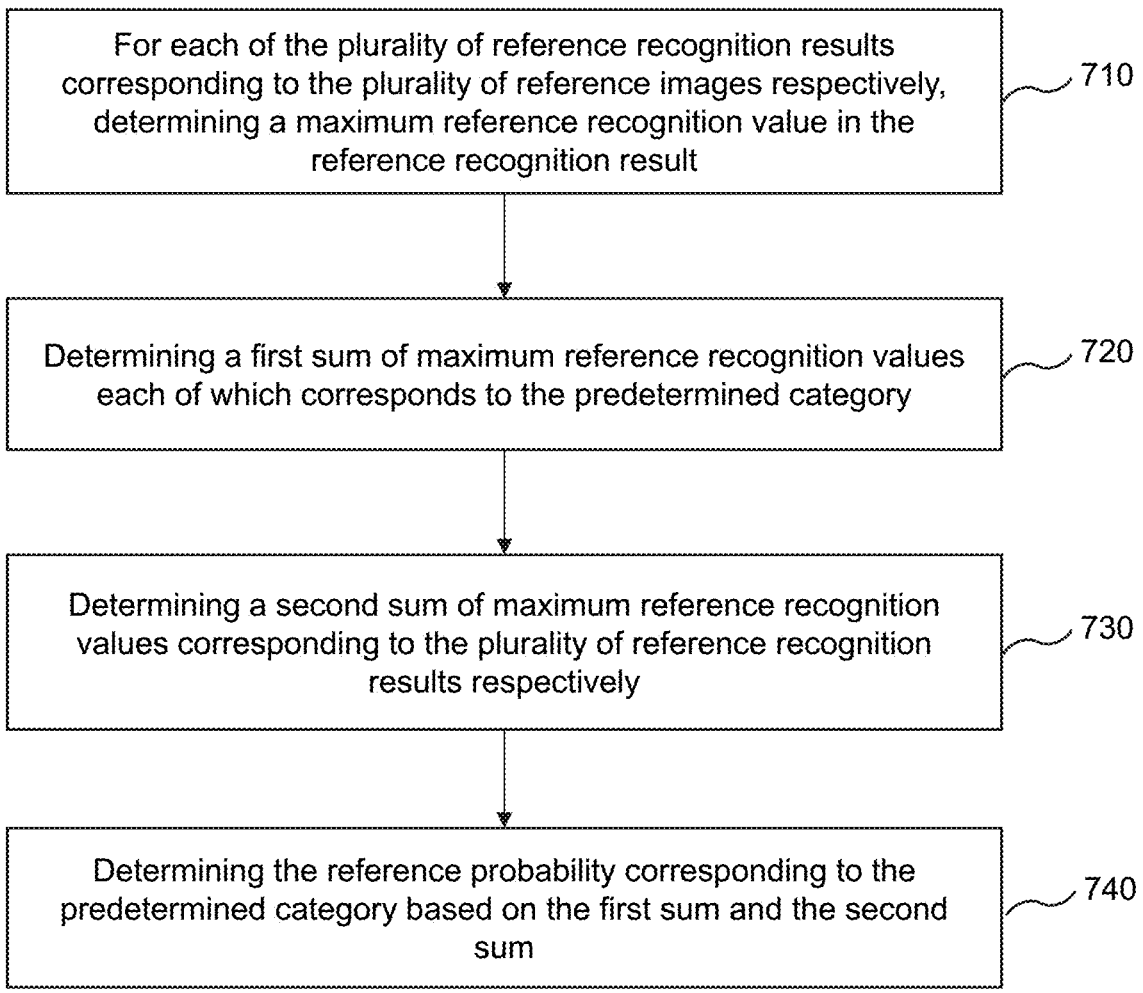
FIG. 7 is a flowchart illustrating an exemplary process for determining a reference probability corresponding to a predetermined category according to some embodiments of the present disclosure.

FIG. 7 is a flowchart illustrating an exemplary process for determining a reference probability corresponding to a predetermined category according to some embodiments of the present disclosure. In some embodiments, process 700 may be executed by the object recognition system 100. For example, the process 700 may be implemented as a set of instructions (e.g., an application) stored in a storage device (e.g., the storage device 150, the ROM 230, the RAM 240, and/or the storage 390). In some embodiments, the processing device 112 (e.g., the processor 220 of the computing device 200, the CPU 340 of the mobile device 300, and/or one or more modules illustrated in FIG. 4) may execute the set of instructions and may accordingly be directed to perform the process 700. The operations of the illustrated process presented below are intended to be illustrative. In some embodiments, the process 700 may be accomplished with one or more additional operations not described and/or without one or more of the operations discussed. Additionally, the order of the operations of process 700 illustrated in FIG. 7 and described below is not intended to be limiting. In some embodiments, one or more operations of the process 700 may be performed to achieve at least part of operation 620 as described in connection with FIG. 6.

In 710, for each of the plurality of reference recognition results corresponding to the plurality of reference images respectively, the processing device 112 (e.g., the second obtaining module 430 illustrated in FIG. 4) (e.g., processing circuits of the processor 220) may determine a maximum reference recognition value in the reference recognition result.

As described in connection with FIG. 6, a reference recognition result may include a plurality of reference recognition values corresponding to a plurality of predetermined categories respectively. The processing device 112 may determine the maximum reference recognition value from the plurality of reference recognition values in the reference recognition result.

In 720, the processing device 112 (e.g., the second obtaining module 430 illustrated in FIG. 4) (e.g., processing circuits of the processor 220) may determine a first sum of maximum reference recognition values each of which corresponds to the predetermined category. For example, the first sum may be expressed as a formula (2) below:

$$\Sigma_{i=1}^{K_a} T_i^a \quad (2),$$

where $K_a$ refers to a count of the maximum reference recognition values each of which corresponding to a predetermined category a in the plurality of reference recognition results, and $T_i^a$ refers to a maximum reference recognition value corresponding to the predetermined category a in the i-th reference recognition result.

In 730, the processing device 112 (e.g., the second obtaining module 430 illustrated in FIG. 4) (e.g., processing circuits of the processor 220) may determine a second sum of maximum reference recognition values corresponding to the plurality of reference recognition results respectively. For example, the second sum may be expressed as a formula (3) below:

$$\Sigma_{i=1}^{K} T_i \quad (3),$$

where K refers to a count of the maximum reference recognition values corresponding to the plurality of reference recognition results respectively (i.e., a count of the plurality of reference recognition results corresponding to the plurality of reference images respectively), and $T_i$ refers to a maximum reference recognition value in the i-th reference recognition result. More descriptions of the first sum and the second sum may be found elsewhere in the present disclosure (e.g., FIG. 8 and the descriptions thereof).

In 740, the processing device 112 (e.g., the second obtaining module 430 illustrated in FIG. 4) (e.g., processing circuits of the processor 220) may determine the reference probability corresponding to the predetermined category based on the first sum and the second sum.

In some embodiments, the processing device 112 may determine the reference probability corresponding to the predetermined category as a ratio of the first sum to the second sum. For example, the processing device 112 may determine the reference probability corresponding to the predetermined category according to a formula (4) below:

$$p(a) = \frac{\sum_{i=1}^{K_a} T_i^a}{\sum_{i=1}^{K} T_i} \quad (4)$$

where p(a) refers to the reference probability corresponding to the predetermined category a.

It should be noted that the above description is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure.

Figure 8:
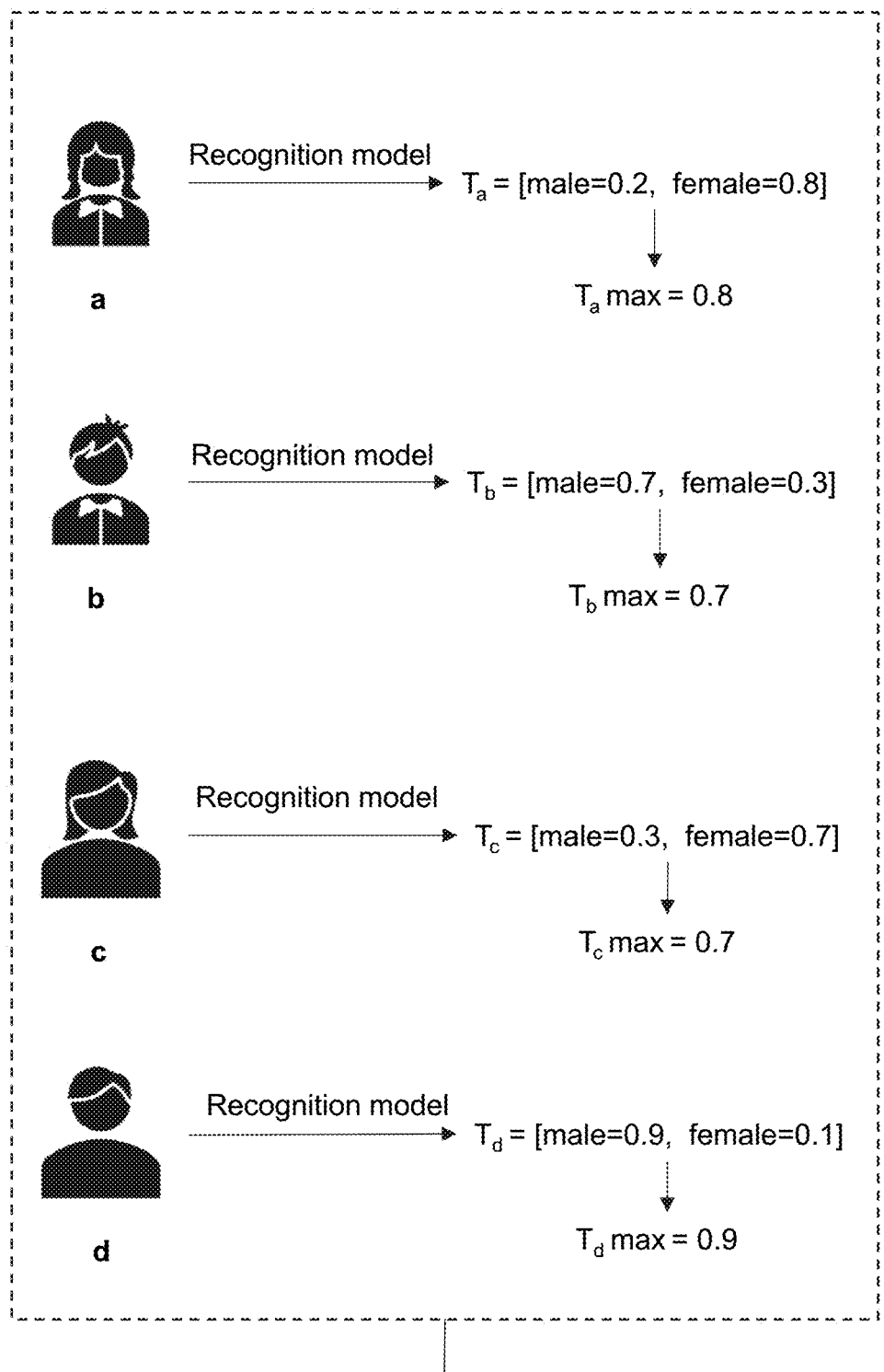
FIG. 8 is a schematic diagram illustrating an exemplary first sum and an exemplary second sum according to some embodiments of the present disclosure.

FIG. 8 is a schematic diagram illustrating an exemplary first sum and an exemplary second sum according to some embodiments of the present disclosure. As illustrated in FIG. 8, a plurality of reference images may include a reference image a, a reference image b, a reference image c, and a reference image d. The reference image a, the reference image b, the reference image c, and the reference image d are inputted into the recognition model and the recognition model outputs corresponding reference recognition results $T_a$, $T_b$, $T_c$, and $T_d$. Each of the reference recognition results $T_a$, $T_b$, $T_c$, and $T_d$ includes two reference recognition values corresponding to predetermined categories "male" and "female" respectively.

For example, the reference recognition result $T_a$=[male=0.2, female=0.8] indicates that reference recognition values corresponding to the predetermined categories "male" and "female" are 0.2 and 0.8 respectively; the reference recognition result $T_b$=[male=0.7, female=0.3] indicates that reference recognition values corresponding to the predetermined categories "male" and "female" are 0.7 and 0.3 respectively; the reference recognition result $T_c$=[male=0.3, female=0.7] indicates that reference recognition values corresponding to the predetermined categories "male" and "female" are 0.3 and 0.7 respectively; the reference recognition result $T_d$=[male=0.9, female=0.1] indicates that reference recognition values corresponding to the predetermined categories "male" and "female" are 0.9 and 0.1 respectively.

Further, the processing device 112 may determine a maximum reference recognition value from the reference recognition values in the reference recognition results $T_a$, $T_b$, $T_c$, and $T_d$. For example, as illustrated in FIG. 8, a maximum reference recognition value in the reference recognition results $T_a$ is $T_a$ max=0.8; a maximum reference recognition value in the reference recognition results $T_b$ is $T_b$ max=0.7; a maximum reference recognition value in the reference recognition results $T_c$ is $T_c$ max=0.7; a maximum reference recognition value in the reference recognition results $T_d$ is $T_d$ max=0.9.

Furthermore, for the predetermined category "male," the processing device 112 may determine a first sum $FS_{male}$ of maximum reference recognition values $T_b$ max and $T_d$ max corresponding to "male," that is, $FS_{male}=T_b$ max+$T_d$ max=0.7+0.9=1.6. The processing device 112 may determine a second sum $SS_{male}$ of maximum reference recognition values $T_a$ max, $T_b$ max, $T_c$ max, and $T_d$ max corresponding to the plurality of reference recognition results $T_a$, $T_b$, $T_c$, and $T_d$ respectively, that is, $SS_{male}=T_a$ max+$T_b$ max+$T_c$ max+$T_d$ max=0.8+0.7+0.7+0.9=3.1. Then the processing device 112 may determine a reference probability p(male) corresponding to the predetermined category "male" as $FS_{male}/SS_{male}$=1.6/3.1.

Figure 9:
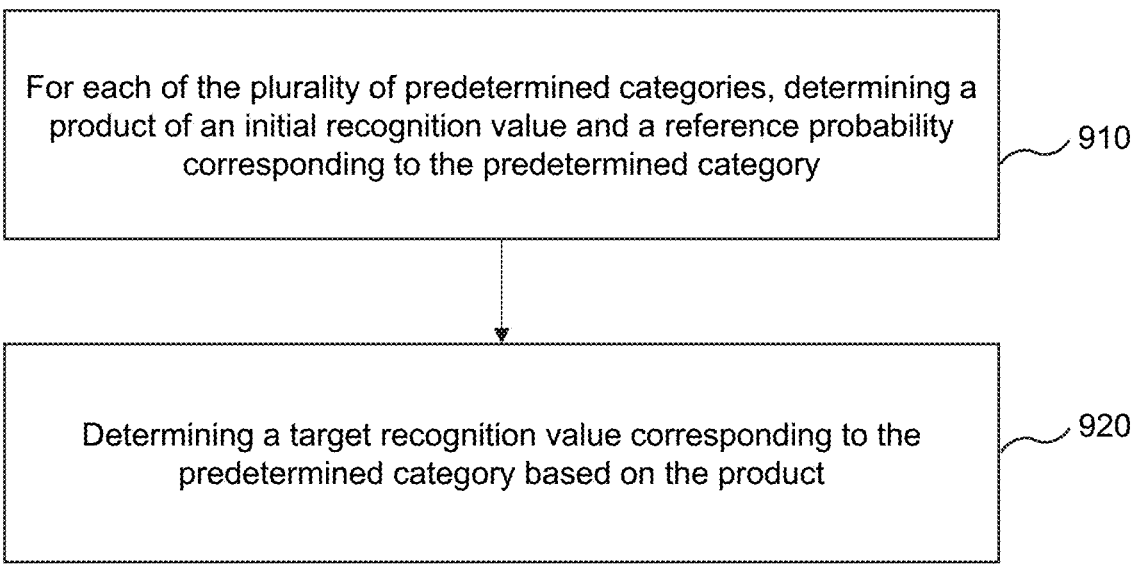
FIG. 9 is a flowchart illustrating an exemplary process for determining a target recognition result of an object according to some embodiments of the present disclosure.

FIG. 9 is a flowchart illustrating an exemplary process for determining a target recognition result of an object according to some embodiments of the present disclosure. In some embodiments, process 900 may be executed by the object recognition system 100. For example, the process 900 may be implemented as a set of instructions (e.g., an application) stored in a storage device (e.g., the storage device 150, the ROM 230, the RAM 240, and/or the storage 390). In some embodiments, the processing device 112 (e.g., the processor 220 of the computing device 200, the CPU 340 of the mobile device 300, and/or one or more modules illustrated in FIG. 4) may execute the set of instructions and may accordingly be directed to perform the process 900. The operations of the illustrated process presented below are intended to be illustrative. In some embodiments, the process 900 may be accomplished with one or more additional operations not described and/or without one or more of the operations discussed. Additionally, the order of the operations of process 900 illustrated in FIG. 9 and described below is not intended to be limiting. In some embodiments, one or more operations of the process 500 may be performed to achieve at least part of operation 540 as described in connection with FIG. 5.

In 910, for each of the plurality of predetermined categories, the processing device 112 (e.g., the second determination module 440 illustrated in FIG. 4) (e.g., the processing circuits of the processor 220) may determine a product of an initial recognition value and a reference probability corresponding to the predetermined category.

As described in connection with FIG. 5, an initial recognition result corresponding to an image k associated with an object may be expressed as a vector $P^k=[p_1^k, p_2^k, \ldots, p_C^k]$, wherein $p_1^k, p_2^k, \ldots$, and $p_C^k$ represent the plurality of initial recognition values in the initial recognition result corresponding to the plurality of predetermined categories 1, 2, ..., c respectively. Accordingly, for the predetermined category 1, the processing device 112 may determine a product (e.g., $p_1^k*p(1)$) of the initial recognition value $p_1^k$ and a reference probability (e.g., p(1)) corresponding to the predetermined category 1; for the predetermined category 2, the processing device 112 may determine a product (e.g., $p_2^k*p(2)$) of the initial recognition value $p_2^k$ and a reference probability (e.g., p(2)) corresponding to the predetermined category 2; ...; for the predetermined category c, the processing device 112 may determine a product (e.g., $p_C^k*p(c)$) of the initial recognition value $p_C^k$ and a reference probability (e.g., p(c)) corresponding to the predetermined category c.

In 920, the processing device 112 (e.g., the second determination module 440 illustrated in FIG. 4) (e.g., the processing circuits of the processor 220) may determine a target recognition value corresponding to the predetermined category based on the product.

In some embodiments, the processing device 112 may designate the product as the target recognition value corresponding to the predetermined category. For example, the processing device 112 may designate the product $p_1^{k}*p(1)$ as the target recognition value (e.g., $p_1^{k'}$) corresponding to the predetermined category 1; the processing device 112 may designate the product $p_2^{k}*p(2)$ as the target recognition value (e.g., $p_2^{k'}$) corresponding to the predetermined category 2; . . . ; the processing device 112 may designate the product $p_C^{k}*p(c)$ as the target recognition value (e.g., $p_C^{k'}$) corresponding to the predetermined category c.

In some embodiments, the processing device 112 may determine a sum of products corresponding to the plurality of predetermined categories respectively. For example, the processing device 112 may determine a sum (e.g., $p_1^{k}*p(1)+p_2^{k}*p(2)+ \ldots +p_C^{k}*p(c)$) of products corresponding to the predetermined categories 1, 2, . . . , c respectively. Further, for each of the plurality of predetermined categories, the processing device 112 may determine the target recognition value corresponding to the predetermined category based on the product corresponding to the predetermined category and the sum of the products corresponding to the plurality of predetermined categories respectively.

For example, the processing device 112 may determine the target recognition value corresponding to the predetermined category 1, 2, and c based on a ratio of the product corresponding to the predetermined category to the sum of the products corresponding to the plurality of predetermined categories 1, 2, . . . , c respectively according to formulas (5)~(7) below:

$$p_1^{k'}=p_1^{k}*p(1)/(p_1^{k}*p(1)+p_2^{k}*p(2)+ \ldots +p_C^{k}*p(c))) \quad (5)$$

$$p_2^{k'}=p_2^{k}*p(2)/(p_1^{k}*p(1)+p_2^{k}*p(2)+ \ldots +p_C^{k}*p(c))) \quad (6)$$

$$p_C^{k'}=p_C^{k}*p(c)/(p_1^{k}*p(1)+p_2^{k}*p(2)+ \ldots +p_C^{k}*p(c))) \quad (7)$$

where $p_1^{k'}$ refers to the target recognition value corresponding to the predetermined category 1, $p_2^{k'}$ refers to the target recognition value corresponding to the predetermined category 2, and $p_C^{k'}$ refers to the target recognition value corresponding to the predetermined category c.

It should be noted that the above description is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure, or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures, or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or collocation of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "unit," "module," or "system." Furthermore, aspects of the present disclosure may take the form of a computer program product embodied in one or more computer readable media having computer-readable program code embodied thereon.

A computer readable signal medium may include a propagated data signal with computer readable program code embodied therein, for example, in baseband or as part of a carrier wave. Such a propagated signal may take any of a variety of forms, including electromagnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in a combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby, and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations thereof, are not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

What is claimed is:

1. A system, comprising:
    at least one storage device including a set of instructions; and
    at least one processor in communication with the at least one storage device, wherein when executing the set of instructions, the at least one processor is directed to perform operations including:
    obtaining an image associated with an object;
    determining, using a recognition model, an initial recognition result of the object based on the image, the initial recognition result including a plurality of initial recognition values corresponding to a plurality of predetermined categories respectively, each of the plurality of initial recognition values indicating an initial probability that the object corresponds to a corresponding predetermined category;
    determining whether the initial recognition result satisfies a preset condition;
    in response to determining that the initial recognition result satisfies a preset condition, for each of the plurality of predetermined categories, obtaining a reference probability corresponding to the predetermined category; and
    determining a target recognition result of the object by adjusting the plurality of initial recognition values based on a plurality of reference probabilities corresponding to the plurality of predetermined categories respectively, the target recognition result including a plurality of target recognition values corresponding to the plurality of predetermined categories respectively, each of the plurality of target recognition values indicating a target probability that the object corresponds to a corresponding predetermined category;
    wherein the obtaining the reference probability corresponding to the predetermined category includes:
    obtaining, from a reference image set, a plurality of reference images; and
    determining the reference probability corresponding to the predetermined category based on a plurality of reference recognition results corresponding to the plurality of reference images respectively, for each of the plurality of reference images, the reference recognition result including a plurality of reference recognition values corresponding to the plurality of predetermined categories respectively;
    wherein the determining the reference probability corresponding to the predetermined category based on the reference recognition results corresponding to the plurality of reference images includes:
    for each of the plurality of reference recognition results corresponding to the plurality of reference images respectively, determining a maximum reference recognition value in the reference recognition result;
    determining a first sum of maximum reference recognition values each of which corresponds to the predetermined category: determining a second sum of maximum reference recognition values corresponding to the plurality of reference recognition results respectively; and
    determining the reference probability corresponding to the predetermined category based on the first sum and the second sum.

2. The system of claim 1, wherein the preset condition includes that the plurality of initial recognition values in the initial recognition result are less than a predetermined threshold.

3. The system of claim 1, wherein the obtaining the reference probability corresponding to the predetermined category includes: obtaining, from a reference image set, a plurality of reference images; and determining the reference probability corresponding to the predetermined category based on a plurality of reference recognition results corresponding to the plurality of reference images respectively, for each of the plurality of reference images, the reference recognition result including a plurality of reference recognition values corresponding to the plurality of predetermined categories respectively.

4. The system of claim 3, wherein each reference image in the reference image set corresponds to one of the pluralities of predetermined categories, counts of reference images corresponding to different predetermined categories being substantially the same.

5. The system of claim 3, wherein for each of the plurality of reference images, a difference or a distance between a corresponding reference recognition result and the initial recognition result is less than a difference threshold or a distance threshold.

6. The system of claim 3, wherein for each of the plurality of reference images, a similarity between the reference image and the image is larger than a similarity threshold.

7. The system of claim 3, wherein the determining the reference probability corresponding to the predetermined category based on the reference recognition results corresponding to the plurality of reference images includes: for each of the plurality of reference recognition results corresponding to the plurality of reference images respectively, determining a maximum reference recognition value in the reference recognition result; determining a first sum of maximum reference recognition values each of which corresponds to the predetermined category; determining a second sum of maximum reference recognition values corresponding to the plurality of reference recognition results respectively; and determining the reference probability corresponding to the predetermined category based on the first sum and the second sum.

8. The system of claim 1, wherein the determining the target recognition result of the object by adjusting the plurality of initial recognition values based on the plurality of reference probabilities corresponding to the plurality of predetermined categories respectively includes: for each of the plurality of predetermined categories, determining a target recognition value corresponding to the predetermined category based on a product of an initial recognition value and a reference probability corresponding to the predetermined category.

9. The system of claim 1, wherein the determining the target recognition result of the object by adjusting the plurality of initial recognition values based on the plurality of reference probabilities corresponding to the plurality of predetermined categories respectively includes: for each of the plurality of predetermined categories, determining a product of an initial recognition value and a reference probability corresponding to the predetermined category; determining a sum of products corresponding to the plurality of predetermined categories respectively; and for each of the plurality of predetermined categories, determining a target recognition value corresponding to the predetermined category based on the product corresponding to the predetermined category and the sum of the products corresponding to the plurality of predetermined categories respectively.

10. The system of claim 1, wherein the operations further include: designating a predetermined category corresponding to a largest target recognition value in the target recognition result as a target category of the object.

11. A method implemented on a computing device including at least one processor, at least one storage medium, and a communication platform connected to a network, the method comprising:
obtaining an image associated with an object;
determining, using a recognition model, an initial recognition result of the object based on the image, the initial recognition result including a plurality of initial recognition values corresponding to a plurality of predetermined categories respectively, each of the plurality of initial recognition values indicating an initial probability that the object corresponds to a corresponding predetermined category;
determining whether the initial recognition result satisfies a preset condition;
in response to determining that the initial recognition result satisfies a preset condition, for each of the plurality of predetermined categories, obtaining a reference probability corresponding to the predetermined category; and
determining a target recognition result of the object by adjusting the plurality of initial recognition values based on a plurality of reference probabilities corresponding to the plurality of predetermined categories respectively, the target recognition result including a plurality of target recognition values corresponding to the plurality of predetermined categories respectively, each of the plurality of target recognition values indicating a target probability that the object corresponds to a corresponding predetermined category;
wherein the obtaining the reference probability corresponding to the predetermined category includes:
obtaining, from a reference image set, a plurality of reference images; and
determining the reference probability corresponding to the predetermined category based on a plurality of reference recognition results corresponding to the plurality of reference images respectively, for each of the plurality of reference images, the reference recognition result including a plurality of reference recognition values corresponding to the plurality of predetermined categories respectively;
wherein the determining the reference probability corresponding to the predetermined category based on the reference recognition results corresponding to the plurality of reference images includes:
for each of the plurality of reference recognition results corresponding to the plurality of reference images respectively, determining a maximum reference recognition value in the reference recognition result;
determining a first sum of maximum reference recognition values each of which corresponds to the predetermined category: determining a second sum of maximum reference recognition values corresponding to the plurality of reference recognition results respectively; and
determining the reference probability corresponding to the predetermined category based on the first sum and the second sum.

12. The method of claim 11, wherein the preset condition includes that the plurality of initial recognition values in the initial recognition result are less than a predetermined threshold.

13. The method of claim 11, wherein the obtaining the reference probability corresponding to the predetermined category includes: obtaining, from a reference image set, a plurality of reference images; and determining the reference probability corresponding to the predetermined category based on a plurality of reference recognition results corresponding to the plurality of reference images respectively, for each of the plurality of reference images, the reference recognition result including a plurality of reference recognition values corresponding to the plurality of predetermined categories respectively.

14. The method of claim 13, wherein each reference image in the reference image set corresponds to one of the pluralities of predetermined categories, counts of reference images corresponding to different predetermined categories being substantially the same.

15. The method of claim 13, wherein for each of the plurality of reference images, a difference or a distance between a corresponding reference recognition result and the initial recognition result is less than a difference threshold or a distance threshold.

16. The method of claim 13, wherein for each of the plurality of reference images, a similarity between the reference image and the image is larger than a similarity threshold.

17. The method of claim 13, wherein the determining the reference probability corresponding to the predetermined category based on the reference recognition results corresponding to the plurality of reference images includes: for each of the plurality of reference recognition results corresponding to the plurality of reference images respectively, determining a maximum reference recognition value in the reference recognition result; determining a first sum of maximum reference recognition values each of which corresponds to the predetermined category; determining a second sum of maximum reference recognition values corresponding to the plurality of reference recognition results respectively; and determining the reference probability corresponding to the predetermined category based on the first sum and the second sum.

18. The method of claim 11, wherein the determining the target recognition result of the object by adjusting the plurality of initial recognition values based on the plurality of reference probabilities corresponding to the plurality of predetermined categories respectively includes: for each of the plurality of predetermined categories, determining a target recognition value corresponding to the predetermined category based on a product of an initial recognition value and a reference probability corresponding to the predetermined category.

19. The method of claim 11, wherein the determining the target recognition result of the object by adjusting the plurality of initial recognition values based on the plurality of reference probabilities corresponding to the plurality of predetermined categories respectively includes: for each of the plurality of predetermined categories, determining a product of an initial recognition value and a reference probability corresponding to the predetermined category; determining a sum of products corresponding to the plurality of predetermined categories respectively; and for each of the plurality of predetermined categories, determining a target recognition value corresponding to the predetermined category based on the product corresponding to the predetermined category and the sum of the products corresponding to the plurality of predetermined categories respectively.

20. A non-transitory computer readable medium, comprising executable instructions that, when executed by at least one processor, direct the at least one processor to perform a method, the method comprising:
  obtaining an image associated with an object;
  determining, using a recognition model, an initial recognition result of the object based on the image, the initial recognition result including a plurality of initial recognition values corresponding to a plurality of predetermined categories respectively, each of the plurality of initial recognition values indicating an initial probability that the object corresponds to a corresponding predetermined category;
  determining whether the initial recognition result satisfies a preset condition;
  in response to determining that the initial recognition result satisfies a preset condition, for each of the plurality of predetermined categories, obtaining a reference probability corresponding to the predetermined category; and
  determining a target recognition result of the object by adjusting the plurality of initial recognition values based on a plurality of reference probabilities corresponding to the plurality of predetermined categories respectively, the target recognition result including a plurality of target recognition values corresponding to the plurality of predetermined categories respectively, each of the plurality of target recognition values indicating a target probability that the object corresponds to a corresponding predetermined category;
wherein the obtaining the reference probability corresponding to the predetermined category includes:
obtaining, from a reference image set, a plurality of reference images; and
determining the reference probability corresponding to the predetermined category based on a plurality of reference recognition results corresponding to the plurality of reference images respectively, for each of the plurality of reference images, the reference recognition result including a plurality of reference recognition values corresponding to the plurality of predetermined categories respectively;
wherein the determining the reference probability corresponding to the predetermined category based on the reference recognition results corresponding to the plurality of reference images includes:
for each of the plurality of reference recognition results corresponding to the plurality of reference images respectively, determining a maximum reference recognition value in the reference recognition result;
determining a first sum of maximum reference recognition values each of which corresponds to the predetermined category; determining a second sum of maximum reference recognition values corresponding to the plurality of reference recognition results respectively; and
determining the reference probability corresponding to the predetermined category based on the first sum and the second sum.

* * * * *